United States Patent
Kosuge et al.

(10) Patent No.: US 6,680,781 B2
(45) Date of Patent: Jan. 20, 2004

(54) CRITICAL DIMENSION MEASUREMENT METHOD AND APPARATUS CAPABLE OF MEASUREMENT BELOW THE RESOLUTION OF AN OPTICAL MICROSCOPE

(75) Inventors: Shogo Kosuge, Tachikawa (JP); Takahiro Shimizu, Higashimurayama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 122 days.

(21) Appl. No.: 10/082,120

(22) Filed: Feb. 26, 2002

(65) Prior Publication Data

US 2002/0145741 A1 Oct. 10, 2002

(30) Foreign Application Priority Data

Feb. 28, 2001 (JP) ........................................ 2001-054266

(51) Int. Cl.⁷ .............................................. G01B 11/04
(52) U.S. Cl. .......................................... 356/636; 348/79
(58) Field of Search ................................ 356/625, 630, 356/634, 635, 636, 640, 614; 348/79, 87; 250/559.19, 559.24, 559.26, 559.29; 702/167

(56) References Cited

U.S. PATENT DOCUMENTS

| 4,385,837 | A | * | 5/1983 | Schram ...................... 356/636 |
| 4,566,192 | A | * | 1/1986 | Hankins et al. ................ 33/1 B |
| 4,674,883 | A | * | 6/1987 | Baurschmidt ................ 356/630 |
| 4,679,941 | A | * | 7/1987 | Fujita ......................... 356/636 |
| 4,690,565 | A | * | 9/1987 | Kato et al. ................... 356/446 |
| 4,707,610 | A | * | 11/1987 | Lindow et al. ......... 250/559.22 |
| 4,725,884 | A | * | 2/1988 | Gurnell et al. ................ 348/79 |
| 4,730,927 | A | * | 3/1988 | Ototake et al. ............. 356/609 |
| 4,744,662 | A | * | 5/1988 | Suto et al. ................... 356/636 |
| 5,298,975 | A | * | 3/1994 | Khoury et al. .............. 356/624 |
| 5,694,220 | A | * | 12/1997 | Ooki et al. .................. 356/601 |
| 5,914,784 | A | * | 6/1999 | Ausschnitt et al. ......... 356/624 |
| 6,571,196 | B2 | * | 5/2003 | Kosuge ....................... 702/167 |

FOREIGN PATENT DOCUMENTS

| JP | 59-176605 | * | 10/1984 |
| JP | 06-103168 | * | 12/1994 |

* cited by examiner

*Primary Examiner*—Hoa Q. Pham
(74) *Attorney, Agent, or Firm*—Antonelli, Terry, Stout & Kraus, LLP

(57) ABSTRACT

A critical dimension measurement method and apparatus capable of measurement even for a object below a resolution of an optical microscope. An image of an object is picked up by using an optical microscope and an image sensor. From an obtained video signal, signal positions of two points coinciding with a predetermined luminance level are extracted. A difference in position between the two points is multiplied by a ratio of maximum luminance between the two points to maximum luminance serving as a reference. On the basis of a resultant product, a size of the object is measured.

10 Claims, 9 Drawing Sheets

10 $(x_0, y_0)$
111 $(-x_1, y_0)$
112 $(x_1, y_0)$
113 $(-x_1, -y_0)$
114 $(x_1, -y_1)$

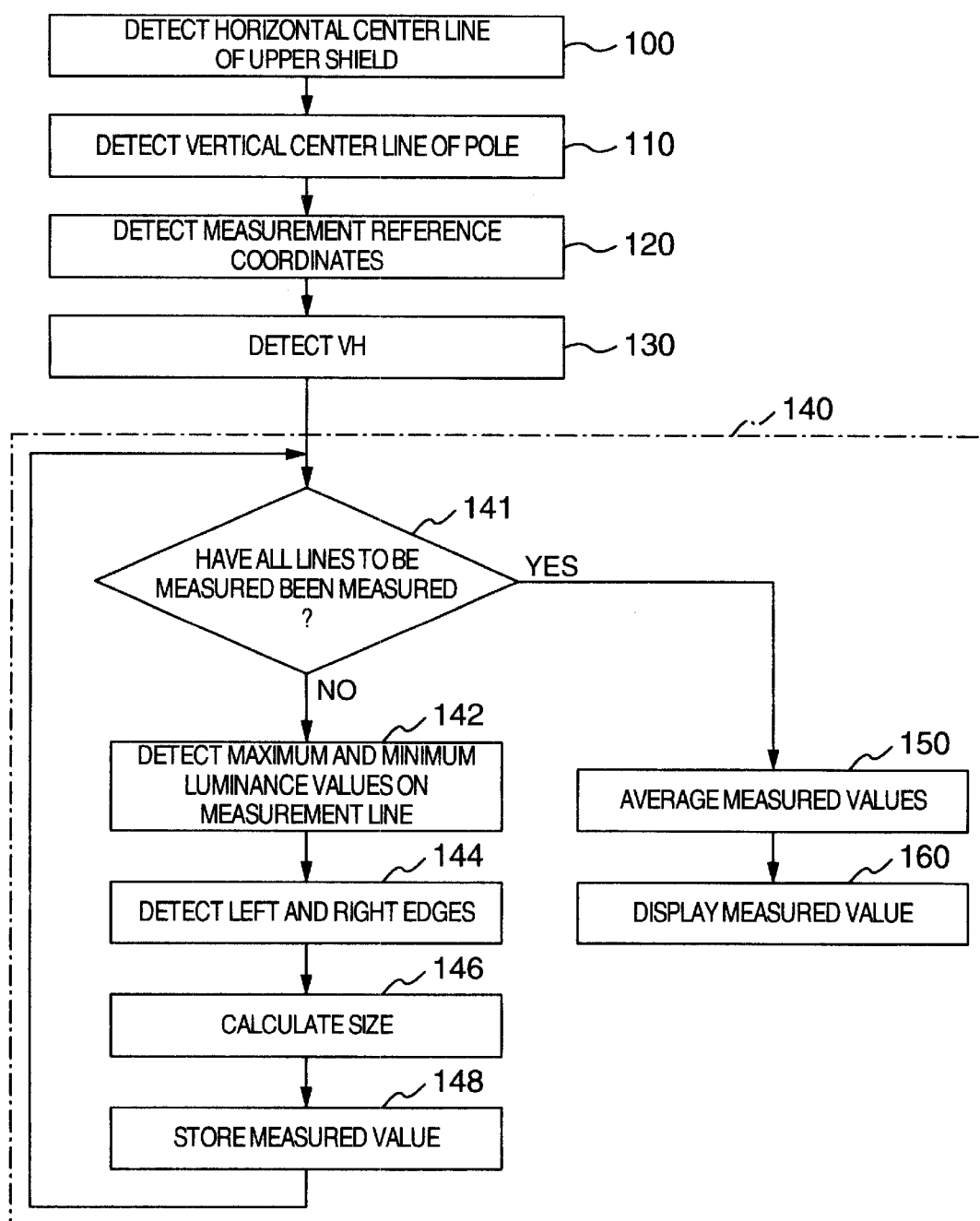

| | | | | |
|---|---|---|---|---|
| ACTUAL SIZE VALUE | 0.36 μm | 0.18 μm | 0.12 μm | 0.095 μm |
| MEASURED VALUE BY PRIOR ART | 0.36 μm | 0.18 μm | 0.13 μm | 0.15 μm |
| | | | | |
| MEASURED VALUE BY EDGE DETECTION METHOD: kxNab | 0.36 | 0.34 | 0.32 | 0.34 |
| VH | 179 | 179 | 179 | 179 |
| Vmax | 179 | 92 | 67 | 50 |
| MEASURED VALUE BY INVENTION kxNab x(Vmax/VH) | 0.36 | 0.18 | 0.12 | 0.095 |

CRITICAL DIMENSION MEASUREMENT METHOD AND APPARATUS CAPABLE OF MEASUREMENT BELOW THE RESOLUTION OF AN OPTICAL MICROSCOPE

CROSS-REFERENCE TO RELATED APPLICATIONS

This invention relates to U.S. patent application Ser. No. 09/725,243, filed on Nov. 29, 2000, in the name of Shogo KOSUGE and entitled "SIZE INSPECTION/ MEASUREMENT METHOD AND SIZE INSPECTION/ MEASUREMENT APPARATUS

BACKGROUND OF THE INVENTION

The present invention relates to a critical dimension measurement method and apparatus utilizing an optical microscope and a two-dimensional image sensor such as a CCD camera. In particular, the present invention relates to a very narrow line size measurement method and apparatus suitable for, although not restricted to, measuring a critical dimension, such as a magnetic head track width and a line width of a photomask for semiconductor fabrication, in a contactless manner.

JP-A-59-176605, for example, describes a basic configuration of a size measurement apparatus. A configuration similar thereto is shown in FIG. 11.

In FIG. 11, an image of an object 307 projected by an optical microscope 305 is picked up by a CCD camera 308. A size measurement processor 309 electrically measures sizes of desired sections of the image obtained by the CCD camera 308. The image and values of sizes of the object 307 are displayed on a video monitor 310. Numeral 306 denotes a light source.

FIG. 6 shows the display screen of the video monitor 310 and a luminance distribution of an image of an object (here a magnetic head surface) 307 picked up by the CCD camera 308 of FIG. 11 on an object scanning line 6 (Li) of the video monitor 310. In this case, as is clear from the luminance distribution on the measurement object scanning line 6 (Li), the luminance becomes largest at the pole 5 portion of the magnetic head.

This critical dimension measurement apparatus obtains the size of a line width of an measurement object (in this case, the size of the track width which is the width of the pole 5) such that a video signal corresponding to the scanning line 6 (Li) is stored in a frame memory (not illustrated) provided in the size measurement processor 309 pixel by pixel to determine respective N-divided pixel positions and obtain the line width of the measurement object based on the N-divided pixel positions and their respective luminance values. More specifically, a maximum luminance level 61 and a minimum luminance level 62 in the luminance distribution are assumed to be 100% and 0%, respectively. A positional difference Nab between an a-th pixel and a b-th pixel which each correspond to a luminance level 63 of 50% is obtained. The positional difference Nab is multiplied by a coefficient k determined according to a magnification factor of the optical microscope 305 and a light receiving size of the CCD camera 308 to obtain a value of size M of the object 307 in accordance with equation (1) below. This method is referred to as edge detection method for the sake of convenience.

$$M = k \times Nab \quad (1)$$

On the other hand, a minimum size limit in size measurement becomes the resolution of the optical microscope. The resolution α is represented by equation (2).

$$\alpha = \lambda/(2 \times NA) \quad (2)$$

where λ is the wavelength, and NA is the numerical aperture of the object lens.

However, the above-described conventional method has a problem that the measurement becomes impossible when the actual size of the object is smaller than the resolution α of the optical microscope. A microscopic size measurement method for solving this problem is disclosed in JP-B-6-103168 (Japanese Patent No. 1967489).

SUMMARY OF THE INVENTION

Hereafter, the problem of the above-described conventional technique will be described by referring to FIG. 7.

FIG. 7 is a diagram showing relations between the resolution α of an optical microscope and the luminance distribution. In FIG. 7, numeral 34 denotes a luminance distribution obtained by picking up the image of a white line having a width 2α, numeral 37 a minimum luminance level, numeral 38 a maximum luminance level (VH), and numeral 41 a threshold level, that is, an intermediate level (50% level) between the maximum luminance level 38 and the minimum luminance level 37. Furthermore, numeral 35 denotes a luminance distribution of a white line having an width α, numeral 39 a maximum luminance level, and numeral 42 a threshold level (50% level). Furthermore, numeral 36 denotes a luminance distribution of a white line having a width less than α, numeral 40 a maximum luminance level, and numeral 43 a threshold level (50%). As shown in FIG. 7, the luminance distribution 34 of the white line with the width 2α, the luminance distribution 35 of the white line with the width α, and the luminance distribution of the white line 36 with the width less than α have sizes 53, 54 and 55 according to the edge detection method, respectively. Although the relation 53>54 holds true, it becomes impossible to determine which one of 54 and 55 is greater or less than the other, which means that, from the luminance distribution of the white line having the width less than α, it is impossible to measure the size of the white line having the line width less than α.

Furthermore, in FIG. 7, numeral 44 denotes a luminance distribution of a black line having a width 2α, numeral 47 a minimum luminance level, and numeral 50 a threshold level (50% level). Furthermore, numeral 45 denotes a luminance distribution of a black line having a width a, numeral 48 a minimum luminance level, and numeral 51 a threshold level (50% level). Furthermore, numeral 46 denotes a luminance distribution of a black line having a width less than α, numeral 49 a minimum luminance level, and numeral 52 a threshold level (50% level). As shown in FIG. 7, the luminance distribution 44 of the black line with the width 2α, the luminance distribution 45 of the black line with the width α, and the luminance distribution 46 of the black line with the width less than a have sizes 56, 57 and 58 according to the edge detection method, respectively. Although the relation 56>57 holds true, it becomes impossible to determine which is greater, 57 or 58, and the size of the black line having the width less than a cannot be measured.

It is now assumed that the numerical aperture of the object lens having a magnification factor of 100 is NA=0.95.

When a visible-ray optical microscope is used and the light source wavelength is $\mu$=0.55 μm, the resolution is, α=0.29 μm;

when an ultraviolet-ray optical microscope is used and the light source wavelength is λ=0.365 μm, the resolution is, α=0.19 μm; and when a deep ultraviolet-ray optical microscope is used and the light source wavelength is λ=0.248 μm, the resolution is, α=0.13 μm. It is impossible to measure objects having the sizes less than these sizes.

In order to address this problem, a method described in JP-B-6-103168 (Japanese Patent No. 1967489) has already been proposed.

FIG. 8 is a diagram for explaining the critical dimension measurement according to this conventional technique. An image of the object 307 shown in FIG. 11 is picked up by the CCD camera 308. A video signal corresponding to one scanning line for size measurement is taken in the size measurement processor 309. Its luminance level is digitized by an A–D converter (not illustrated). The digitized luminance level is stored in a frame memory (not illustrated) formed of a series of storage elements on a pixel by pixel basis. A luminance level characteristic in each pixel position at this time is shown in FIG. 8. It is now assumed that pixel addresses on the frame memory are 0 to N and a luminance level of an address i is Vi. It is also assumed that a maximum value 61 of a stored luminance level 60 is its 100% level and a minimum value 62 of the stored luminance level 60 is its 0% level. A value of a threshold level $T_L$ 63 is set to be, for example, a 50% level. Addresses of pixels a and b having the same luminance level as the threshold level $T_L$ 63 are obtained. And luminance levels at all addresses between the pixels a and b (i.e., luminances above the threshold level $T_L$) are added up. An integral value S of the luminance level Vi between the pixels a and b is obtained by the following equation (3).

$$S = \sum_{i=a}^{b} (Vi - T_L) \quad (3)$$

The integral value S has a close proportional relation to the actual size of the object 307. The integral value S is multiplied by a previously calculated coefficient k which is determined by an optical magnification factor of the microscope 305 and so on. A measured size value M of the object 307 is thus obtained by the following equation (4).

$$M = k \sum_{i=a}^{b} (Vi - T_L) \quad (4)$$

The explanation above is directed to a size measurement method in the case where the size of the measurement object is less than the resolution α of the microscope. In the size measurement method in the case where the size of the measurement object is not less than the resolution α of the microscope, the measurement method based on the position difference between contours of the object image according to the conventional technique described first can also be used in combination. Accordingly, according to this conventional size measurement method, the size measurement is possible for not only a measurement object having the size not less than the resolution α but also for a measurement object having the size less than the resolution α. The measurement method according to this conventional technique provides a measured value characteristic 72 shown in FIG. 9. The measured value characteristic 72 is closer to an ideal size value characteristic 71 than a measured value characteristic 70 obtained by using only edge detection components is.

As to this conventional microscopic size measurement, the following fact has been found as a result of actual measurements in the past many years. In the case where the measurement object is a black or light absorptive gap or line width such as a gap length of a magnetic head, it has been already established that there is a good correlation relative to the actual size value (value measured by a scanning electron microscope or SEM for length measurement) as far as up to the width α/3. In the case where the measurement object is a white or light reflective line width such as a track width of a magnetic head, however, the present inventors has discovered that no correlation exists relative to the actual size value (value measured by SEM) at near a width α/2 when only the positional difference between contours and the luminance integral value are used.

An example will now be described by referring to FIG. 10. FIG. 10 is a diagram showing relations between the resolution α and luminance distribution when an ultraviolet-ray optical microscope is used.

When the wavelength of a light source is λ=0.365 μm, α is α=0.19 μm. In the case of a size measurement using a luminance distribution of a white line, a luminance distribution 34 of a white line having the width 2α, a luminance distribution 35 of a white line having the width a, a luminance distribution 36 of a white line having the width 2α/3, and a luminance distribution 80 of a white line having the width α/2 become as shown in FIG. 10. Actual size values and measured values according to the conventional technique in that case are shown in FIG. 10. As seen from this, the measured value obtained from the luminance distribution 36 of the white line having the width 2α/3 becomes 0.13 μm according to the conventional technique, whereas the measure value obtained from the luminance distribution 80 of the white having the width α/2 becomes 0.15 μm. The size relation is thus reversed, and hence measurement is impossible.

An object of the present invention is to provide a critical dimension measurement method and apparatus capable of conducting measurement with respect to even an object having a size of resolution or less of an optical microscope.

In FIG. 10, looking at the maximum luminance in the luminance distribution of a white line for each line width, it can be seen that the maximum luminance 38 (Vmax) in the luminance distribution 34 of a white line having a width sufficiently wider than the resolution α (here, the width is 2α) is the maximum luminance (VH) serving as a reference in the measurement of white line widths. Further, it can be seen that the maximum luminance 40 in the luminance distribution 36 of the white line having the width 2α/3 is lower than the maximum luminance 39 in the luminance distribution 35 of the white line having the width α and the maximum luminance 81 in the luminance distribution 80 of the white line having the width α/2 is lower than the maximum luminance 40 in the luminance distribution 36 of the white line having the width 2α/3. In other words, as the white line width gets narrower, the maximum luminance Vmax also becomes lower, from which the present inventors have found that by correcting the measured value $M_0$ (k×Nab in FIG. 10) obtained by the conventional size measurement method explained with reference to FIG. 11 with the maximum luminance Vmax relative to the reference maximum luminance VH, a measurement value M can be obtained which has a good correlation with the actual size value. More specifically, the present inventors have found that measured values having a good correlation with actual size values can be obtained by multiplying the measured value $M_0$ obtained by the conventional technique by the maximum luminance Vmax and dividing a resultant product by a maximum luminance VH of the luminance distribution 34 obtained by picking up the image of a white line having a width wider than the width α. This is expressed by the following equation (5). As a result, it becomes possible to provide measured values satisfying the relation: white line (α)>white line (α/2)>white line (α/3)>white line (α/4).

$$M=M_0 \times (Vmax/VH) \qquad (5)$$

According to the measurement of the present invention, the measured value becomes 0.12 μm for the luminance distribution 36 of the white line having the width 2α/3 and 0.095 μm for the luminance distribution 80 of the white line having the width α/2, from which it is seen that the measured values show a good agreement with the actual values.

A critical dimension measurement apparatus according to one aspect of the present invention, comprising: an optical microscope; an image picking up apparatus coupled to the optical microscope for picking up the image of an object to be measured; a display apparatus for displaying a video signal obtained from the image picking up apparatus; and an operating unit for processing the video signal to calculate a size of a predetermined portion of the object, wherein the operating unit calculates a distance between two points of the predetermined portion of the object substantially coinciding with a predetermined first luminance level, and corrects the calculated distance with information on an extremum of a second luminance level of the predetermined portion.

In one embodiment, the first luminance level is set to be a predetermined level between a maximum value and a minimum value of the luminance level of the predetermined portion of the object.

In one embodiment, the information on the extremum of the second luminance level includes a ratio of a maximum luminance level between the two points corresponding to the first luminance level to a maximum luminance level to be used as a reference in the predetermined portion of said object.

In one embodiment, the size, denoted as M, of the predetermined portion of the object is calculated in accordance with an equation, $$M=M_0 \times (Vmax/VH)$$

where $M_0$: a size value detected by an edge detection method, Vmax: the maximum luminance level between the two points corresponding to the first luminance level, VH: a maximum luminance level at a portion greater than a resolution of the optical microscope serving as the reference.

In one embodiment, the object is a track width of a magnetic head.

In one embodiment, the object is a line width of a photomask for fabricating a semiconductor wafer. In one embodiment, the critical dimension measurement apparatus includes a video peak detection circuit for optimizing a quantity of light incident on the image picking up apparatus.

A critical dimension measuring method according to another aspect of the invention comprising: a first step of picking up an image of an object by using an optical microscope and an image sensor, and detecting a luminance of a portion of the object wider than a width equivalent to a resolution of the optical microscope, as a maximum luminance level (VH) to be used as a reference; a second step of detecting a luminance-pixel characteristic of the object on one measurement line which crosses a measurement region of the object, by using the image sensor, and storing the luminance-pixel characteristic in a memory on a pixel by pixel basis; a third step of obtaining a maximum luminance (Vmax) and a minimum luminance (Vmin) from the luminance-pixel characteristic of the object; a fourth step of multiplying a difference between the maximum luminance and the minimum luminance by a predetermined ratio to obtain a threshold level; a fifth step of obtaining a distance (Nab) between pixels corresponding to the threshold level; and a sixth step of calculating a size of the object from a value obtained by multiplying the distance (Nab) by a ratio of the maximum luminance (Vmax) to the reference maximum luminance level (VH).

In one embodiment, the critical dimension measurement method further comprising a step of optimizing a quantity of light incident on the image sensor, before the first step.

In one embodiment, the critical dimension measurement method further comprising a step of repeating the second to sixth steps on a plurality of measurement line, averaging a plurality of sizes of the object obtained at the sixth steps, and thereby calculating a more accurate size of the object.

BRIEF DESCRIPTION OF THE DRAWINGS

The foregoing and other objects, features and advantages of the invention will be apparent from the following more particular description of the embodiments of the invention as illustrated in the accompanying drawings wherein:

FIG. 2 is a flow chart showing a track width size measurement process of FIG. 1, according to a critical dimension measurement method of a second embodiment of the present invention;

DESCRIPTION OF THE EMBODIMENTS

Figure 1:
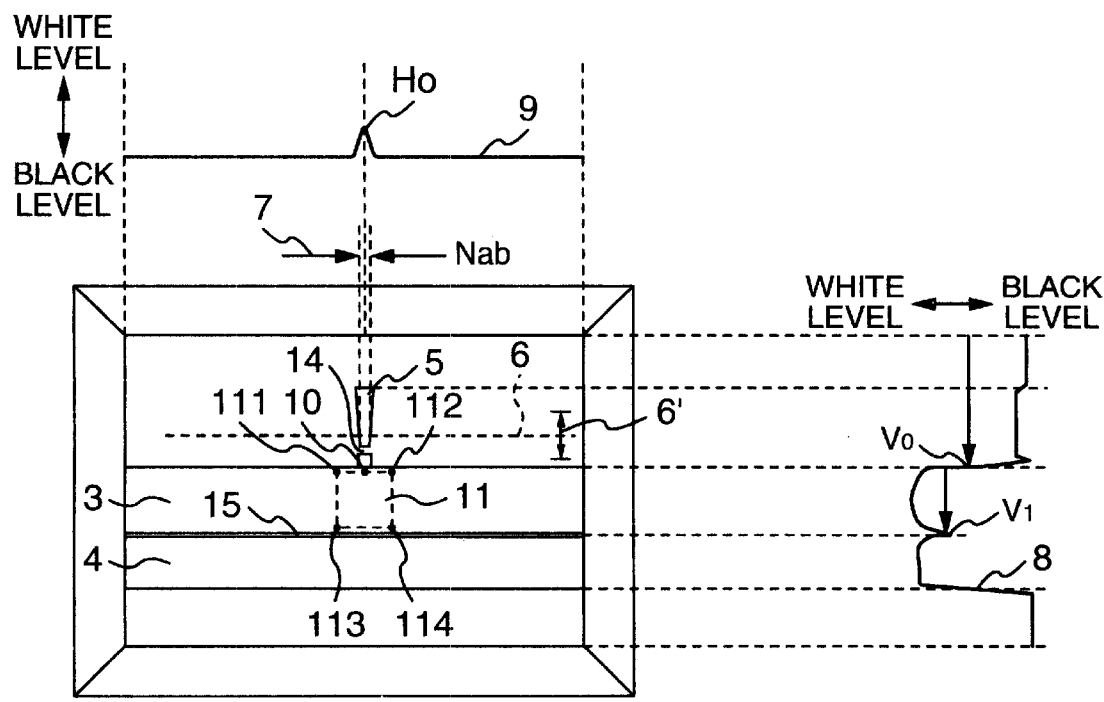
FIG. 1 shows an image on a video monitor picked up by a critical dimension measurement apparatus shown in FIG. 5 according to a first embodiment of the present invention, when an object is a track width of a magnetic head (GMR head)

Hereafter, embodiments of the present invention will be described by referring to the drawings. In the drawings, similar components are denoted by like numerals.

Figure 5:
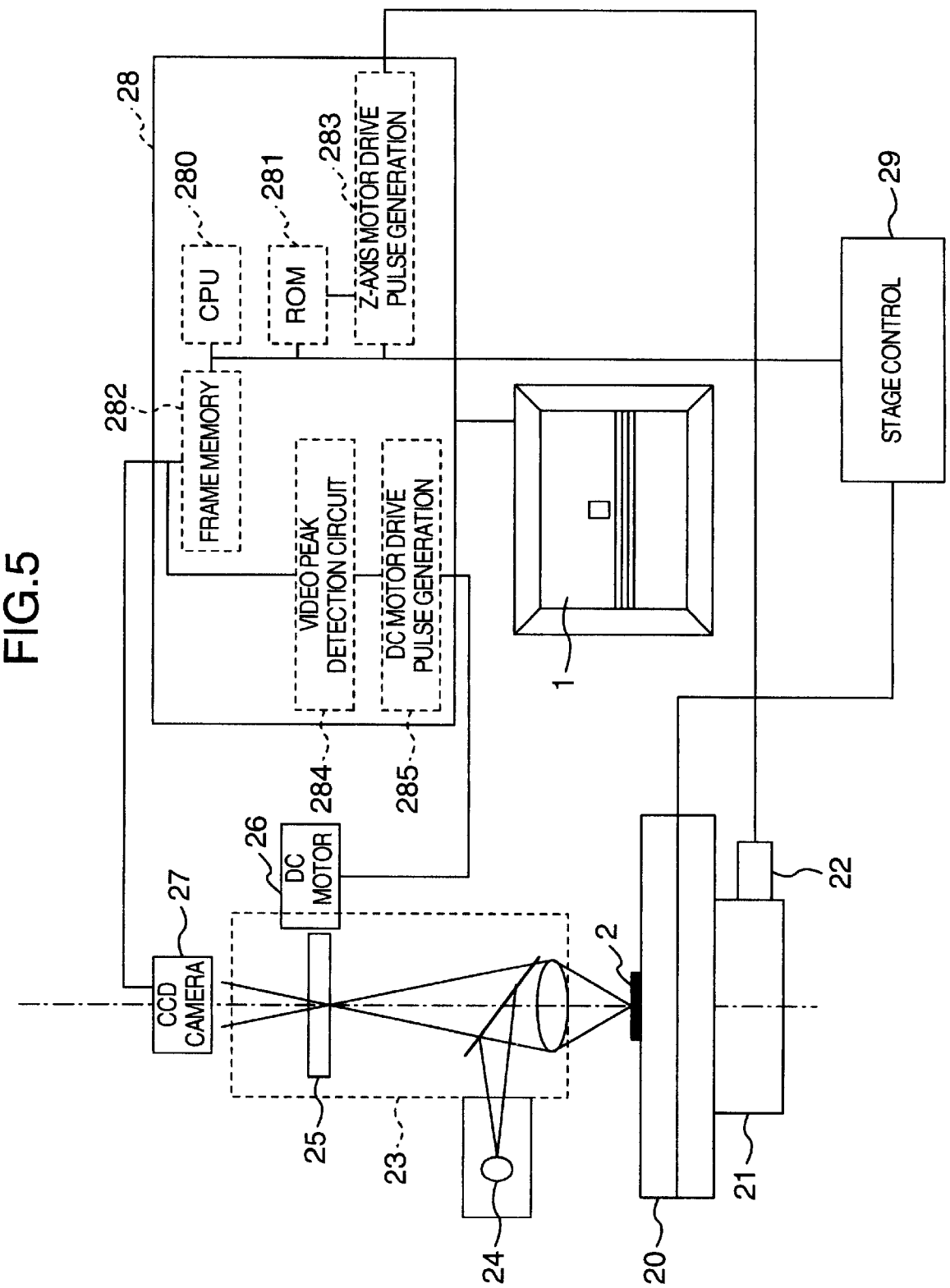
FIG. 5 is a configuration diagram of a critical dimension measurement apparatus of a first embodiment according to the present invention.
Figure 6:
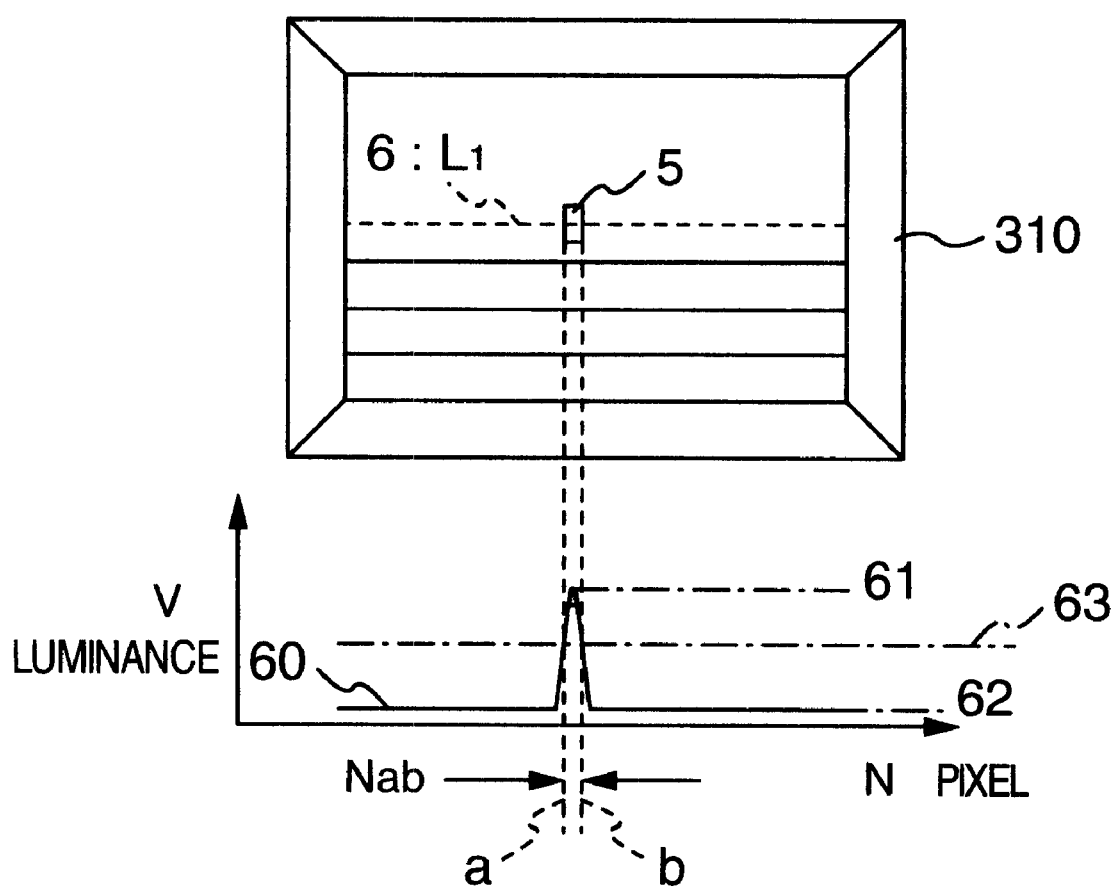
FIG. 6 is a diagram showing a video monitor of FIG. 5 and an example of luminance distribution displayed on the video monitor.
Figure 7:
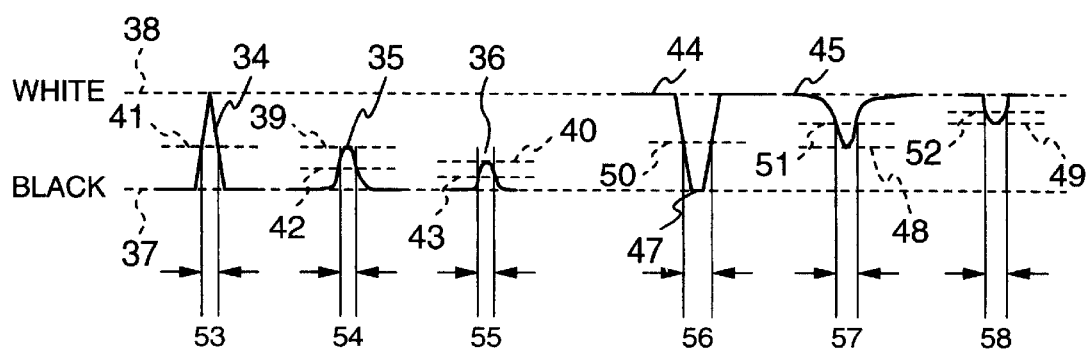
FIG. 7 is a diagram showing relations between resolution a and luminance distribution.

FIG. 5 shows a configuration of a critical dimension measurement apparatus according to an embodiment of the present invention.

In FIG. 5, an image of an object 2 projected by an optical microscope 23 is picked up by a CCD camera 27. A size measurement processor 28 electrically measures sizes of desired sections by means of waveform processing of a video signal. The image and values of sizes of the object 2 are displayed on a video monitor 1. The size measurement processor 28 includes a CPU 280, a ROM 281, a frame memory 282, a Z-axis motor drive pulse generation section 283, a video peak detection circuit 284, and a DC motor drive pulse generation section 285.

The object 2 is placed on an X–Y stage 20 and moved to a field of vision of the microscope 23. The CPU 280 orders a stage control section 29 via an RS-232C line to conduct the movement. As for a movement of the object 2 in a focus direction, the CPU 280 orders the Z-axis motor drive pulse generation section 283 to drive a Z-axis movement motor 22, move the Z-axis stage 21 upward or downward, and achieve the in-focus state.

As for optimization of the quantity of light incident on the CCD camera 27, the video peak detection circuit 284 detects a luminance peak value of a video signal in a predetermined range. The DC motor drive pulse generation section 285 compares the luminance peak value with a reference value, which is not illustrated, drives a DC motor 26 by an output obtained from the comparison, and controls a light depreciation mechanism 25 to adjust the quantity of light.

A critical dimension measurement method according to another embodiment of the present invention will now be described by referring to FIGS. 1, 2 and 5.

FIG. 1 shows an image on the video monitor 1 obtained when the periphery of a track width of a magnetic head (GMR head) serving as an object is picked up by the critical dimension measurement apparatus shown in FIG. 5.

In the image displayed on the video monitor 1 shown in FIG. 1, an upper shield 3, a lower shield 4, and a pole 5 of the magnetic head look bright and white, and the periphery thereof (i.e. a write gap 14 between the pole 5 and the upper shield 3, a read gap 15 between the upper shield 3 and the lower shield 4 and so on) looks dark and black. In this case, since the width of the upper shield 3 is sufficiently wider than the width of the resolution α, providing a maximum luminance, which is stored as the maximum luminance VH serving as a reference and used when measuring a track width 7, which is a width of a white line (the pole 5) on a measurement line 6. Here, 10 lines are shown by the measurement line 6, as a representative. 6' denotes 10 lines located above and below a specified position.

FIG. 2 is a flow chart showing a process for measuring the track width size of FIG. 1. (1) Step 100: detect horizontal center line of upper shield face 3

By adding the luminance on the monitor screen in the horizontal direction for each scanning line, a projection image 8 (FIG. 1) in the vertical direction is obtained. A point "$V_0$" which exceeds a predetermined threshold level in the vertical projection image 8 is detected. Further, a point "$V_1$" which falls downward in the direction from the white level to the black level and comes below the maximum white level by a noise level is detected.

(2) Step 110: detect vertical center line of the pole 5

By adding up luminance of the monitor screen above the point "$V_0$" in the vertical direction, a projection image 9 in the horizontal direction is obtained. A point "$H_0$" having a maximum luminance of the projection image 9 in the horizontal direction is detected.

(3) Step 120: detect measurement reference coordinates

Measurement reference coordinates 10 is set as ($x_0$, $y_0$)=($H_0$, $V_0$), where ($x_0$, $y_0$) is an origine of x–y axis of coordinates.

(4) Step 130: detect the maximum luminance VH serving as a reference

Using the measurement reference coordinates 10 ($x_0$, $y_0$) as a reference, a VH detection area 11 surrounded by four points 111 ($-x_1$, $y_0$), 112 ($x_1$, $y_0$), 113 ($-x_1$, $-y_1$) and 114 ($x_1$, $-y_1$) which are preset in the upper shield 3, is formed. In the VH detection area 11, a maximum luminance value VH serving as a reference is obtained. For the purpose of noise reduction, the maximum value VH is represented by an average value of luminance of 10×10 pixels located around the maximum value.

(5) Step 141: have all lines to be measured been already measured?

If all of lines to be measured which is 10 lines 6' above and below the specified position in the above example, have already been measured, the processing proceeds to step 150: average measured values. Otherwise, the processing proceeds to step 142: detect maximum and minimum luminance values of the measurement line.

(6) Step 142: detect maximum and minimum luminance values of a measurement line

Figure 8:
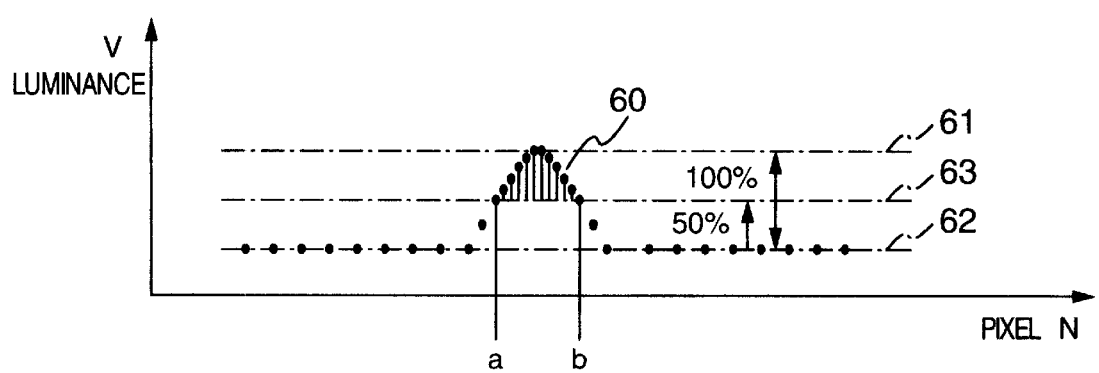
FIG. 8 is a diagram showing measurement of a critical dimension according to a conventional technique.
Figure 9:
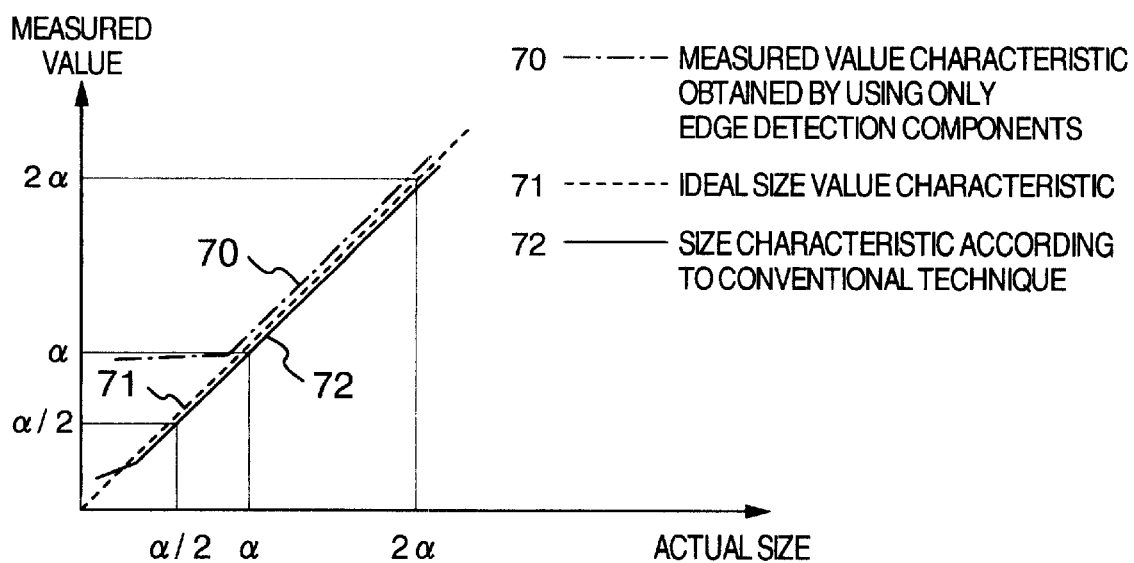
FIG. 9 is a characteristic diagram showing actual sizes and measured values according to a conventional technique.
Figure 10:
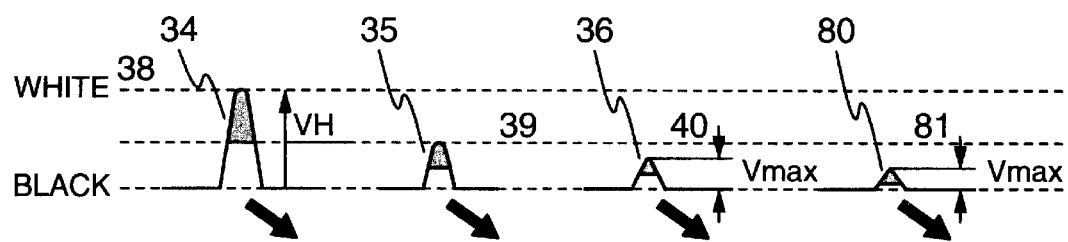
FIG. 10 is a diagram showing relations among actual size values, measured values according to a conventional technique, and measured values according to the present invention.
Figure 11:
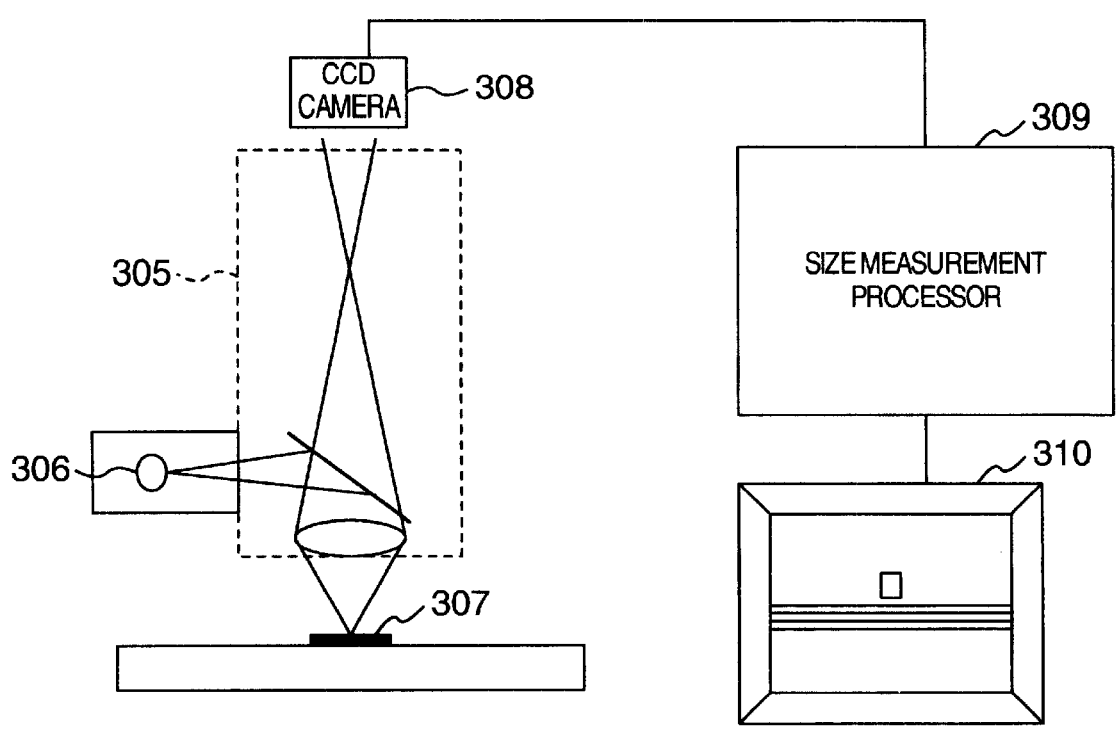
FIG. 11 is a diagram showing a configuration of a conventional size measurement apparatus.

By conducting measurement on one measurement line, a pixel-luminance characteristic as represented by 60 in FIG. 8 is obtained. Maximum luminance (Vmax) 61 and minimum luminance (Vmin) 62 therein are obtained. As a noise prevention countermeasure, the maximum luminance is obtained by, for example, averaging luminance values of a pixel having maximum luminance and three pixels located around it. The minimum luminance is obtained by, for example, averaging luminance values of a pixel having minimum luminance and ten pixels located around it. In addition, a luminance level 63 which is a 50% value between the maximum luminance and the minimum luminance is calculated.

(7) Step 144: detect left and right edges

In the same way as the conventional edge detection technique, a positional difference Nab between an a-th pixel and a b-th pixel which each correspond to the luminance level 63 is obtained. The positional difference Nab is multiplied by a coefficient k determined according to a magnification factor of the optical microscope 23 and a light receiving size of the CCD camera 27 to obtain a value of the rough size $M_0$ of the object 2.

$$M_0 = k \times Nab \tag{6}$$

(8) Step 146: calculate size

By multiplying the obtained rough size $M_0$ by (maximum luminance Vmax of the measurement line)/(maximum luminance VH serving as the reference), the true size value M is calculated.

$$M = (k \times Nab) \times (Vmax/VH) \tag{7}$$

(9) Step 148: store measured value

The size value M is stored, and the processing returns to the step 141.

(10) Step 150: average measured values

A measured value is obtained by averaging size values M of all measurement lines.

(11) Step 160: display measured value

The measured value M is displayed on the video monitor 1 to inform the worker of the result. In addition, the measured value is stored on, for example, a hard disk serving as a storage medium.

The foregoing explanation has been made with respect to the track width measurement of a magnetic head (GMR head), in which case the upper shield 3 is sufficiently wider than the resolution α, making it possible to obtain the reference maximum luminance VH from the same screen as one used for the track width measurement.

Still another embodiment of the critical dimension measurement method according to the present invention will now be described.

In the embodiment described above, the reference luminance VH is obtained from the same screen as that having the measurement region. Depending upon the kind of the measurement object, the maximum luminance VH serving as the reference cannot be always obtained from the screen displaying the measurement region in some cases. Hereafter, measurement of a line width of a photomask for fabricating semiconductors which is an example of such an object will be described by referring to FIGS. 3A, 3B, 4 and 5.

Figure 3A:
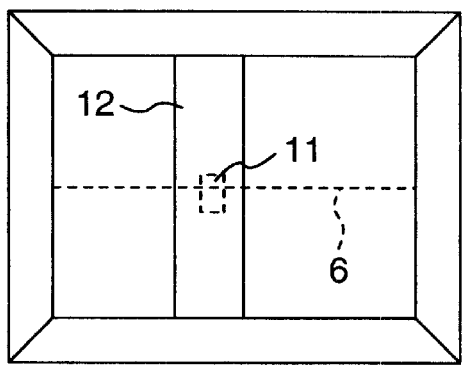
FIGS. 3A and 3B each shows an image on a video monitor picked up by a critical dimension measurement apparatus shown in FIG. 5, according to a critical dimension measurement method of a third embodiment of the present invention, when an object is a line width of a photomask for fabricating semiconductor wafers.
Figure 3B:
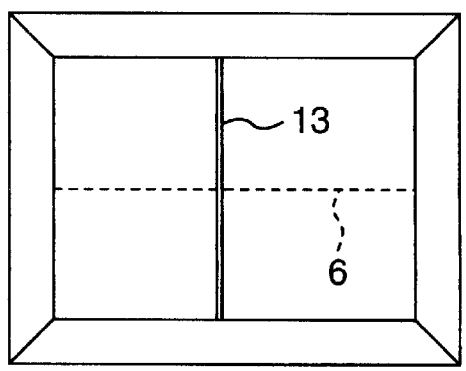
Figure 4:
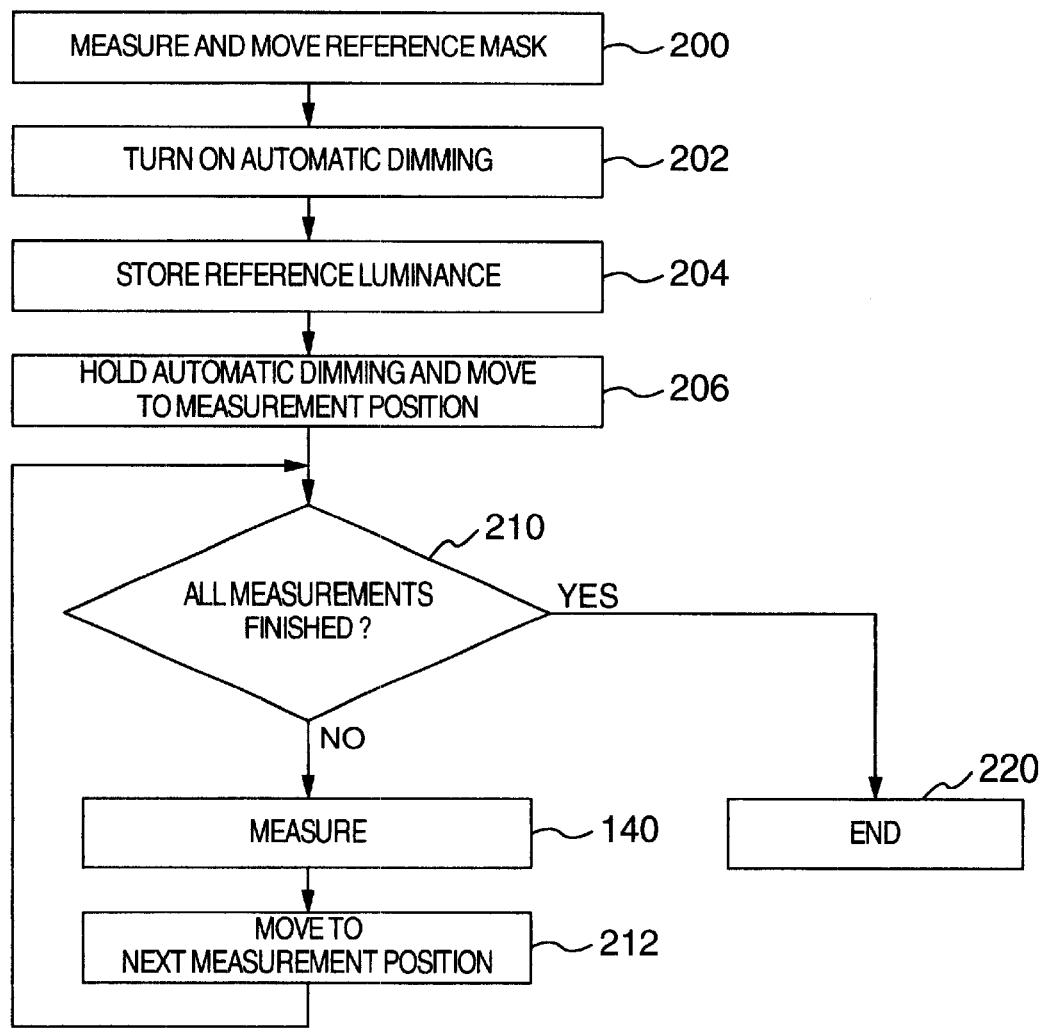
FIG. 4 is a flow chart showing a line width size measurement process for generating semiconductor wafers of FIGS. 3A and 3B, according to a critical dimension measurement method of a third embodiment of the present invention.

FIGS. 3A and 3B show images on the video monitor picked up by the critical dimension measurement apparatus of FIG. 5 in the case where the measurement object is a line width of the photomask for fabricating semiconductor wafers according to the embodiment. FIG. 4 is a flow chart showing a measurement process of the line width of the photomask for fabricating semiconductor wafers of FIG. 3B. By obtaining maximum luminance on a reference photomask and registering the maximum luminance VH serving as the reference according to FIGS. 3A, 3B and 4, measurement becomes possible.

The measurement process of the line width of the photomask for fabricating semiconductor wafers shown in FIG. 4 will now be described.

(1) Step 200: measure and move reference photomask

A reference photomask 12 which is wide enough to register the reference luminance VH is placed on the X–Y stage 20 (FIG. 5), and moved to a field of vision of the optical microscope 23. The CPU 280 orders a stage control section 29 via an RS-232C line to conduct the movement. As for a movement of the measurement object 2 in a focus direction, the CPU 280 orders the Z-axis motor drive pulse generation section 283 to drive a Z-axis movement motor 22, move the Z-axis stage 21 upward or downward, and achieve the in-focus state. A resultant image is shown in FIG. 3A. Numeral 6 denotes a measurement line, numeral 11 a VH detection area set as required, and numeral 12 a white line (mask) for luminance detection.

(2) Step 202: turn on automatic dimming

As for optimization of the quantity of light incident on the CCD camera 27 (FIG. 5), the video peak detection circuit 284 detects a luminance peak value of a video signal in a predetermined range. The DC motor drive pulse generation section 285 compares the luminance peak value with a reference value, which is not illustrated, drives the DC motor 26 by an output obtained from the comparison, and controls the light depreciation mechanism 25 to adjust the quantity of light.

(3) Step 204: store maximum luminance VH serving as reference

A VH detection area is formed. In the VH detection area 11, a maximum luminance value VH is obtained. For the purpose of noise reduction, the maximum value VH is determined to be an average value of luminance of 10×10 pixels located around the maximum value.

(4) Step 206: hold automatic dimming

The DC motor 26 and the light depreciation mechanism 25 are stopped. The quantity of illumination light at which the maximum luminance VH serving as the reference has been obtained is held.

(5) Step 210: determine whether all measurements have been finished

If the result is "yes," the processing proceeds to step 220: finish measurement. If the result is "no," the processing proceeds to step 140: measure.

(6) Step 140: measure

The object (mask) 13 shown in FIG. 3B is moved in the field of vision of the optical microscope 23 and measurement is conducted in the same way as the routine 140 ranging from the step 141 to the step 160 shown in FIG. 2.

(7) Step 212: move to next measurement position

The processing returns to the step 210.

In the above, explanation has been made, referring to FIG. 4, with respect to the line width measurement in the case where a line width wide enough to obtain the maximum luminance VH serving as the reference and a line width to be measured are mixedly present on one photomask. However, cases where measurement can be conducted by using the measurement method of FIG. 4 are not limited to such specific line width measurement. For example, those line widths may be present on separate photomasks. To be concrete, it is possible to conduct the procedures (1) to (4) on a mask having a line width wide enough to register the maximum luminance VH serving as the reference, sets the light depreciation mechanism 25 to its stop position, store the maximum luminance VH serving as the reference, then place and position the mask of the measurement object on the X–Y stage in the same way as (1), obtain an in-focus image, and conduct measurement according to (5) and (6).

According to the above-described embodiments, measurement becomes possible even for an object having a critical dimension below the resolution of an optical microscope.

The present invention has been described primarily with respect to the block diagram illustrations of FIGS. 2 and 4. It will be understood that many of the blocks can be implemented by computer program instructions that are stored in the ROM 281. It will be further understood by those skilled in the art that the foregoing description has been made on embodiments of the invention and that various changes and modifications may be made in the invention without departing from the spirit and scope of the appended claims.

What is claimed is:

1. A critical dimension measurement apparatus comprising:

an optical microscope;

an image picking up apparatus coupled to said optical microscope for picking up the image of an object to be measured;

a display apparatus for displaying a video signal obtained from said image picking up apparatus; and a processing unit for processing said video signal to calculate a size of a predetermined portion of said object, wherein said processing unit calculates a distance between two points of said predetermined portion of said object, respective luminance levels of said two points substantially coinciding with a predetermined first luminance level, and corrects said calculated distance with information relating to an extremum of a second luminance level of said predetermined portion.

2. A critical dimension measurement apparatus according to claim 1, wherein said first luminance level is designated a predetermined level between a maximum value and a minimum value of the luminance level of said predetermined portion of said object.

3. A critical dimension measurement apparatus according to claim 1, wherein said information relating to said extremum of the second luminance level includes a ratio of a maximum luminance level between said two points to a maximum luminance level to be used as a reference in said predetermined portion of said object.

4. A critical dimension measurement apparatus according to claim 3, wherein a size, denoted as M, of said predetermined portion of said object is calculated in accordance with an equation, $$M = M_0 \times (Vmax/VH)$$

where $M_0$: a size value detected by an edge detection method, Vmax: the maximum luminance level between the two points, respective luminance levels of which correspond to said first luminance level, VH: a maximum luminance level at a portion greater than a resolution of said optical microscope serving as the reference.

5. A critical dimension measurement apparatus according to claim 4, wherein said object is a track width of a magnetic head.

6. A critical dimension measurement apparatus according to claim 4, wherein said object is a line width of a photomask for fabricating a semiconductor wafer.

7. A critical dimension measurement apparatus according to claim 1, further comprising a video peak detection circuit for optimizing a quantity of light incident on said image picking up apparatus.

8. A critical dimension method comprising:
    a first step of picking up an image of an object by using an optical microscope and an image sensor, and detecting a luminance of a portion of said object wider than a width equivalent to a resolution of said optical microscope, as a maximum luminance level (VH) to be used as a reference;
    a second step of detecting a luminance-pixel characteristic of said object on one measurement line which crosses a measurement region of said object, by using said image sensor, and storing the luminance-pixel characteristic in a memory on a pixel by pixel basis;
    a third step of obtaining a maximum luminance (Vmax) and a minimum luminance (Vmin) from the luminance-pixel characteristic of said object;
    a fourth step of multiplying a difference between the maximum luminance and the minimum luminance by a predetermined ratio to obtain a threshold level;
    a fifth step of obtaining a distance (Nab) between pixels corresponding to the threshold level; and
    a sixth step of calculating a size of said object from a value obtained by multiplying said distance (Nab) by a ratio of the maximum luminance (Vmax) to the reference maximum luminance level (VH).

9. A critical dimension measurement method according to claim 8, further comprising a step of optimizing a quantity of light incident on said image sensor, before the first step.

10. A critical dimension measurement method according to claim 8, further comprising a step of repeating the second to sixth steps on a plurality of measurement line, averaging a plurality of sizes of said object obtained at the sixth steps, and thereby calculating a more accurate size of said object.

* * * * *